United States Patent
Leeming et al.

(10) Patent No.: US 9,006,301 B2
(45) Date of Patent: Apr. 14, 2015

(54) LIQUID FORMULATION

(75) Inventors: Stephen Leeming, Cheshire (GB); Mark Dixon, Merseyside (GB); Andrew Overend, Bolton (GB)

(73) Assignee: Colormatrix Holdings, Inc., Wilmington, DE (US)

( * ) Notice: Subject to any disclaimer, the term of this patent is extended or adjusted under 35 U.S.C. 154(b) by 451 days.

(21) Appl. No.: 13/447,688

(22) Filed: Apr. 16, 2012

(65) Prior Publication Data

US 2012/0252913 A1 Oct. 4, 2012

Related U.S. Application Data

(63) Continuation-in-part of application No. PCT/GB2010/051735, filed on Oct. 14, 2010.

(30) Foreign Application Priority Data

Oct. 16, 2009 (GB) .................................. 0918092.8

(51) Int. Cl.
*C08J 9/06* (2006.01)
*C08F 114/06* (2006.01)
*C08J 9/08* (2006.01)
*C08J 9/10* (2006.01)

(52) U.S. Cl.
CPC .... *C08J 9/08* (2013.01); *C08J 9/06* (2013.01); *C08J 9/10* (2013.01); *C08J 9/103* (2013.01); *C08J 9/105* (2013.01); *C08J 2201/03* (2013.01); *C08J 2327/06* (2013.01)

(58) Field of Classification Search
CPC .................. C08J 9/06; C08J 9/08; C08J 9/10; C08J 9/103; C08J 9/105; C08J 2201/03; C08J 2327/06

USPC .................................. 521/79, 89, 95, 98, 142
See application file for complete search history.

(56) References Cited

U.S. PATENT DOCUMENTS

| | | | |
|---|---|---|---|
| 3,067,151 A | 12/1962 | Terry et al. | |
| 3,608,006 A * | 9/1971 | Hosoda et al. | 264/46.1 |
| 3,956,008 A * | 5/1976 | Knepper et al. | 106/464 |
| 4,021,380 A * | 5/1977 | Nuttall | 521/85 |
| 4,167,503 A * | 9/1979 | Cipriani | 524/297 |
| 4,571,416 A * | 2/1986 | Jarzombek et al. | 524/474 |
| 4,613,629 A | 9/1986 | Duchane | |
| 4,904,702 A | 2/1990 | Allen | |
| 5,611,962 A * | 3/1997 | Garcia et al. | 524/320 |
| 5,789,453 A * | 8/1998 | Detterman | 521/92 |
| 7,166,802 B2 * | 1/2007 | Cusson et al. | 174/113 R |
| 2003/0162014 A1 | 8/2003 | MacQueen | |

FOREIGN PATENT DOCUMENTS

| | | |
|---|---|---|
| EP | 0 385 092 A2 | 9/1995 |
| JP | 62253439 A | 11/1987 |
| JP | 2004051871 A | 2/2004 |

OTHER PUBLICATIONS

LANXESS "Plastic Additives Blowing Agents" [online], Oct. 2004. Available from http://www.experts4additives.com/imperia/md/content/pma/service/treibmittel_3.pdf [Accessed Oct. 1, 2011].

* cited by examiner

*Primary Examiner* — Irina S Zemel
(74) *Attorney, Agent, or Firm* — Fay Sharpe LLP

(57) ABSTRACT

A formulation for foaming a thermoplastic polymer, for example PVC, comprises a carrier, exothermic and endothermic chemical blowing agents and 1 wt %, preferably less than 0.2 wt % of water. The liquid formulation can readily be used for foaming PVC and other thermoplastics.

27 Claims, 1 Drawing Sheet

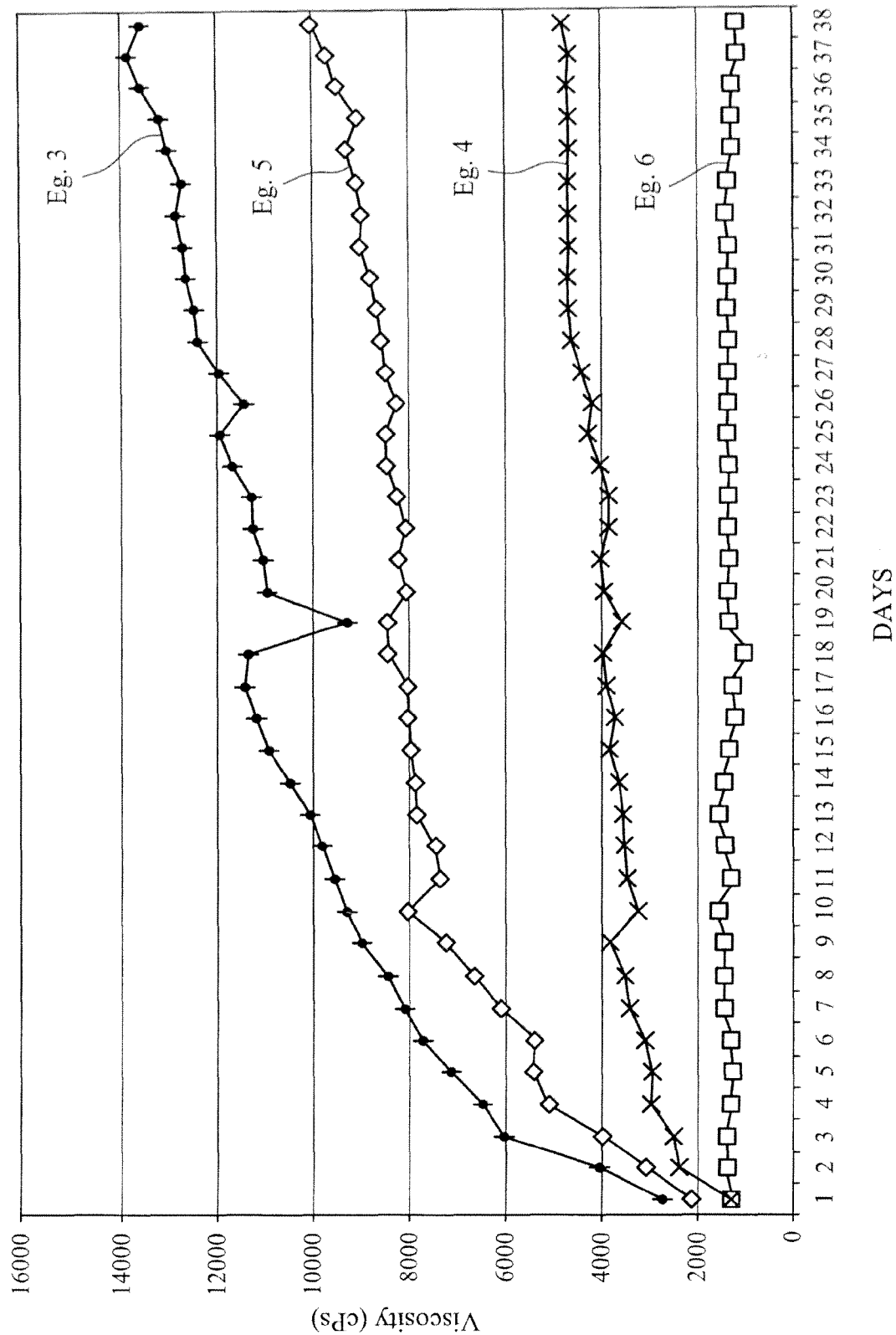

LIQUID FORMULATION

This application is a continuation-in-part filing claiming the benefit of International Application PCT/GB2010/051735, filed 14 Oct. 2010, which designated the United States, and which is hereby incorporated by reference.

This invention relates to a liquid formulation and particularly, although not exclusively, relates to a liquid formulation for foaming a thermoplastic polymer, for example polyvinylchloride polymer (PVC) used in making extruded sheets.

It is well-known to use solid formulations to deliver chemical blowing agents into thermoplastic polymers, including PVC. However, solid formulations, for example pellets or powders, can be difficult to handle and/or accurately dose into the thermoplastic polymer. Furthermore, it may also be difficult to ensure even distribution of the blowing agent throughout the thermoplastic polymer which may lead to inconsistent and/or coarser cell structures.

It is an object of the present invention to address the above described problem.

According to a first aspect of the invention, there is provided a liquid formulation for foaming a thermoplastic polymer, said formulation comprising:
a carrier; and
a chemical blowing agent;
wherein said formulation includes 1 wt % of water or less.

A liquid formulation as described may be advantageous over known solid formulations since it allows more even distribution within the thermoplastic polymer thereby forming a finer and more consistent cell structure and a highly smooth surface finish of melt processed parts. Furthermore, it can be accurately dosed into the polymer and easily handled. Another advantage may be that it can be formulated to have negligible effect on the colour of the final product (e.g. PVC sheet) compared to use of solid master batches. Additionally, by ensuring the formulation includes no more than 1 wt % of water, the formulation is stable over time, meaning it has a long shelf-life and produces consistent reproducible results when used.

The level of water in the formulation may be measured using an Aquatrac+ moisture meter, from Brabender using 1 g of dispersion in sample holder 3 (also referred to as C) at 80° C. until a steady state is achieved.

References to a state of a material herein (e.g. a liquid) refer to the state at standard temperature and pressure (STP).

Said formulation may include less than 0.7 wt % water, suitably less than 0.5, preferably less than 0.3 wt %, more preferably less than 0.2 wt %, especially less than 0.13 wt %. In some cases, the amount of water may be 0.1 wt % or less.

Said formulation preferably comprises a dispersion, wherein suitably said chemical blowing agent is dispersed in said carrier.

Solids in said liquid formulation are suitably in a finely divided form.

Said liquid formulation preferably includes at least 20 wt %, more preferably at east 30 wt % of a said chemical blowing agent.

The total amount of chemical blowing agents in said formulation is suitably at least 30 wt %, suitably at least 40 wt %, preferably at least 50 wt %, more preferably at least 60 wt %, especially at least 65 wt %. Said total amount may be 90 wt % or less, 80 wt % or less, or 75 wt % or less.

Said liquid formulation may include one or a plurality of exothermic chemical blowing agents. The formulation may include at least 20 wt %, suitably at least 25 wt %, preferably at least 30 wt % of exothermic blowing agents. The formulation may include 60 wt % or less; or 50 wt % or less of exothermic blowing agents. Said one a plurality of exothermic chemical blowing agents is preferably dispersed in said carrier.

Exothermic chemical blowing agents may be selected from azodicarbonamide (ADC) and oxybissulphonylhydrazide (OBSH).

Said formulation preferably comprises ADC. It may comprise at least 5 wt %, at least 10 wt %, at least 15 wt % or at least 20 wt % ADC. Said ADC is preferably dispersed in said carrier.

Said formulation preferably comprises OBSH. It may comprise at least 5 wt %, at least 10 wt %, at least 15 wt %, or at least 20 wt % OBSH. Said OBSH is preferably dispersed in said carrier.

Said formulation may include an activator, for activating the one or plurality of exothermic blowing agents. Such activator may comprise a transition metal oxide, for example zinc oxide.

Said formulation may include one or a plurality of endothermic chemical blowing agents. The formulation may include at least 20 wt %, suitably at least 25 wt %, preferably at least 30 wt % of endothermic blowing agents. The formulation may include 60 wt % or less, 50 wt % or less, 40 wt % or less, 35 wt % or less of endothermic blowing agents. Said one or said plurality of endothermic blowing agents is preferably dispersed in said carrier.

An endothermic blowing agent may be a bicarbonate, for example sodium bicarbonate.

Said formulation may comprise at least 10 wt %, suitably at least 15 wt %, preferably at least 20 wt %, more preferably at least 25 wt % of a bicarbonate, for example an alkali metal carbonate such as sodium bicarbonate. Said bicarbonate is preferably dispersed in said carrier.

The ratio of the sum of the wt % of exothermic blowing agent(s) to the sum of the wt % of endothermic blowing agent(s) in said formulation may be in the range 0.5 to 2, preferably in the range 0.7 to 1.5, more preferably in the range 0.8 to 1.3.

The sum of the amounts of solid materials dispersed in the formulation is suitably in the range 50 to 85 wt %, preferably 60 to 80 wt %.

Said formulation may include at least 15 wt %, preferably at least 20 wt %, more preferably at least 23 wt % carrier. It may include less than 40 wt %, preferably less than 35 wt %, more preferably less than 30 wt % carrier. The total level of liquid in the formulation may be in the range 20 to 40 wt %, preferably 20 to 30 wt %.

Said carrier preferably comprises one or a plurality of oils. Said carrier may comprise a vegetable or mineral oil, with the latter being preferred.

Said formulation suitably includes a surface active agent, for example a surfactant. Said formulation may include at least 1 wt %, suitably at least 2.5 wt %, preferably at least 4 wt % surfactant. The amount of surfactant may be less than 10 wt %, less than 8 wt % or less than 6 wt %. A surface active agent may comprise fatty acid esters of polyethylene glycols and polypropylene glycols; dialkyl terminated polyethylene glycol; and hyperdispersants such as Solsperse 11000.

Said liquid formulation may include:
15 to 40 wt % carrier;
one or a plurality of exothermic chemical blowing agents, wherein the total amount of such blowing agents is in the range 25 to 45 wt %;
one or a plurality of endothermic chemical blowing agents, wherein the total amount of such blowing agents is in the range 25 to 45 wt %;
1 wt % of water or less.

Said liquid formulation may include:
20 to 30 wt % mineral oil;
ADC and OBSH, wherein the total amount of such blowing agents is in the range 30 to 40 wt %;
a bicarbonate (e.g. sodium bicarbonate), wherein the total amount of bicarbonate in the formulation is in the range 30 to 40 wt %;
1 wt % or less (preferably 0.2 wt % or less) of water.

Said formulation may include other components such as thickening agents, stabilizing agents and/or colours.

Said liquid formulation is suitable for foaming PVC. It may be for use in the manufacture of PVC foamed sheets.

In one preferred embodiment, said liquid formulation may include a desiccant which is dissolved or dispersed in said carrier of said liquid formulation. It is preferably dispersed in said liquid carrier.

Said desiccant is suitably arranged to bind or react with water in the liquid formulation, suitably so it is not available for reaction with water sensitive materials or otherwise available to disadvantageously affect the liquid formulation and/or the PVC into which the liquid formulation is introduced. It is preferred that the water remains associated with (e.g. bound to or reacted with) the desiccant as the temperature is elevated (e.g. up to 350° C. to maintain stability of the formulation to shipping, storage at elevated temperature and during melt-processing). Materials that have a relatively large (e.g. greater than 30 kJ mol$^{-1}$, more preferably greater than 60 kJ mol$^{-1}$) negative energy of hydration or reaction with water are preferred for this purpose as they will interact strongly with water in the formulation and/or polyester.

Examples of desiccants include alumino silicates, silica gel, sodium alumino silicates, calcium silicates, calcium sulfate, magnesium sulfate, calcium chloride, montmorillonite clay, molecular sieves, metal oxides such as of calcium or magnesium, metal chlorides such as chlorides of calcium or magnesium, metal silanes such as tetraethoxysilane or vinyl silanes, hydrides, such as calcium hydride and lithium hydride Said desiccant suitably generates and/or loses less than 5 wt % (more preferably less than 3 wt %, especially less than 1 wt %) of water when heated to 300° C. (the approximate melt processing temperature of polyester). For example, calcium oxide, a preferred desiccant, forms calcium hydroxide on reaction with water. Whilst calcium hydroxide can be dehydrated by heating, the temperature required to cause dehydration is above the processing temperature of PVC.

Said liquid formulation may include less than 3 wt %, suitably less than 2.5 wt %, preferably less than 2 wt %, more preferably less than 1.5 wt % of a desiccant. Said liquid formulation may include at least 0.001 wt %, suitably at least 0.01 wt %, preferably at least 0.1 wt %, more preferably at least 0.5 wt %, especially at least 0.75 wt % of a said desiccant.

The total amount of desiccants in said liquid formulation may be less than 3 wt %, suitably less than 2.5 wt %, preferably less than 2 wt %, more preferably less than 1.5 wt % desiccant. The total amount of desiccants in said liquid formulation may be at least 0.001 wt %, suitably at least 0.01 wt %, preferably at least 0.1 wt %, more preferably at least 0.5 wt %, especially at least 0.75 wt %.

A said desiccant, preferably each desiccant, in said formulation is preferably dispersed in said liquid formulation and/or is substantially insoluble in said liquid carrier.

The particle size and particle size distribution described herein may be measured by methods such as those described in Size Measurement of Particles entry of Kirk-Othmer Encyclopedia of Chemical Technology, Vol. 22, 4$^{th}$ ed., (1997) pp. 256-278, incorporated herein by reference. For example, particle size and particle size distributions may be determined using a Fisher Subsieve Sizer or a Microtrac Particle-Size Analyzer manufactured by Leeds and Northrop Company, or by microscope techniques, such as optical microscopy, scanning electron microscopy or transmission electron microscopy.

The or preferably each desiccant in said formulation may be in the form of finely divided particles, preferably with a median particle size of less than 20 μm, more preferably less than 10 μm and especially less than 5 μm. [As used herein, a $d_{50}$ particle size is the median diameter, where 50% of the volume is composed of particles larger than the stated $d_{50}$, and 50% of the volume is composed of particles smaller than the stated $d_{50}$ value. As used herein, the median particle size is the same as the $d_{50}$ particle size.]

A range of particle size distributions may be useful. The particle size distribution, as used herein, may be expressed by the "span (S)," where S is calculated by the following equation:

$$S = \frac{d_{90} - d_{10}}{d_{50}}$$

where $d_{90}$ represents a particle size diameter in which 90% of the volume is composed of particles having a diameter smaller than the stated $d_{90}$; and $d_{10}$ represents a particle size in which 10% of the volume is composed of particles having a diameter smaller than the stated $d_{10}$.

Particle size distributions of desiccant particles in which the span is less than 10, or less than 5 or less than 2 for example may be used. Alternatively, the particle size distribution (S) may range even broader, such as less than 15, less than 25 or less than 50.

Preferably, the or each desiccant in said formulation may comprise particles having sizes and/or distributions as described.

Said desiccant is preferably inorganic. It preferably comprises an oxide, sulphate or halide (especially chloride) of a metal, for example an alkaline earth metal. It is preferably a calcium or magnesium compound, suitably an oxide or chloride thereof.

Said desiccant preferably comprises, more preferably consists essentially of, calcium oxide.

Preferably, at least 50 wt %, at least 70 wt %, or at least 95 wt % of desiccant in said formulation is made up of a single desiccant which is preferably calcium oxide.

Said liquid formulation as made suitably has a viscosity at 20-25° C. (suitably measured using a Brookfield DV-I viscometer with spindle 4 at 20 rpm) of greater than 1000 cP, preferably greater than 2000 cP, more preferably greater than 3000 cP, especially at least 3500 cP. The viscosity as aforesaid may be less than 100000 cP, preferably less than 50000 cP, more preferably less than 30000 cP, especially no more than 5300 cP.

The rise in viscosity of said liquid formulation measured at 20-25° C. (suitably measured using a Brookfield DV-I viscometer with spindle 4 at 20 rpm) after incubation of said formulation at 50° C. for 6 weeks is suitably less than 20000 cP, preferably less than 15000 cP, more preferably less than 10000 cP, especially less than 5000 cP. In a preferred embodiment, the rise measured as aforesaid is no more than 2100 cP.

According to a second aspect of the invention, there is provided a method of preparing a liquid formulation according to said first aspect, the method comprising contacting a carrier and a chemical blowing agent.

The method may comprise selecting all components of the formulation such that the total amount of water associated with the components prepared is 1 wt % or less so that after contact the formulation prepared includes 1 wt % of water or less; or the method may comprise treating the formulation after preparation to reduce the level of water contained within it. Where the liquid formulation comprises a desiccant, the method may include contacting said carrier with a said desiccant.

The method may comprise selecting an exothermic blowing agent formulation which comprises one or preferably a plurality of exothermic chemical blowing agents as described according to the first aspect; and dispersing the blowing agent formulation in said carrier. The amount of water in the selected blowing agent formulation is preferably less than 0.3 wt %. The amount of water in the selected carrier is preferably less than 0.25 wt % based on the total weight of said carrier.

The method may comprise selecting an endothermic blowing agent formulation which may consist of a single blowing agent or comprise one or a plurality of blowing agents, as described according to the first aspect, and dispersing the blowing agent formulation in said carrier. The amount of water in said endothermic blowing agent formulation is preferably less than 0.3 wt %.

The method suitably includes contact of the components of the liquid formulation with a surface active agent.

The method may include contacting components of the liquid formulation with one or more lubricants and/or processing aids which are commonly used in PVC processing.

According to a third aspect of the invention, there is provided a method of preparing a foamed thermoplastic polymer, the method comprising contacting a liquid formulation according to the first or second aspect with a thermoplastic polymer or a precursor of a thermoplastic polymer.

The method preferably comprises contacting the liquid formulation with the polymer during melt processing, for example extrusion of the polymer. Preferably the liquid formulation is introduced directly into an extruder, for example via a feed throat of the extruder.

The invention extends to a method of making an extruded foam material, the method comprising contacting a thermoplastic polymer and a liquid formulation according to the first or second aspects in an extruder under such conditions (e.g. at a temperature in the range 150-190°) that the liquid formulation produces gas which foams the polymer.

The extruded foam material may be made from PVC. It may comprise an extruded sheet.

The invention extends to the use of a liquid formulation according to the first or second aspects for foaming a thermoplastic polymer.

Any feature of any aspect of any invention or embodiment described herein may be combined with any feature of any aspect of any other invention or embodiment described herein mutatis mutandis.

Specific embodiments of the invention will now be described, by way of example, with reference to FIG. 1 which is a graph of viscosity v. time (days) for specified formulations.

The following materials are referred to hereinafter:

Genitron EPE (Trade Mark)—a blowing agent formulation obtained from Lanxess, containing azodicarbonamide (ADC) (an exothermic chemical blowing agent), oxybissulphonyl-hydrazide (OBSH) (an exothermic chemical blowing agent) and zinc oxide (an activator, to lower the blowing temperature of the ADC). The Genitron EPE is in the form of a powder blend and was used as received.

Sodium bicarbonate—Genitron TP BCH51051. The material is used as an endothermic chemical blowing agent. It was used as received.

Surfactant—a polymeric dispersant with amine anchor sold under the name Solplus11CM50 by Noveon (UK).

Mineral Oil—a hydrotreated middle distillate sold under the name Consol 340 by Chemical Solvents Inc.

Calcium oxide—a calcium oxide powder sold under the name CALOXOL™ by Omya UK.

Stabilizer—a hydrophobic fumed silica sold under the name Aerosil™ by Evonik.

Example 1

Preparation of Liquid Dispersion 500 g of dispersion was made in a 1 liter plastic container by initially mixing Mineral Oil (125 g), Surfactant (25 g), Genitron EPE (175 g) and Genitron TP BCH51051 (175 g). Mixing was initially undertaken manually to start to incorporate the solid materials in the liquid; and subsequently mixing was continued using a Hamilton Beach high speed laboratory mixer for two minutes at speed 1 and then two minutes at speed 3.

Thus, a dispersion was prepared comprising the following:

| Material | % in formulation |
|---|---|
| Mineral Oil | 25 |
| Surfactant | 5 |
| Genitron EPE | 35 |
| Sodium Bicarbonate | 35 |

The formulation of Example 1 was assessed over a period of time and it was found that its viscosity increased which could affect the handleability, the ability to accurately dose the formulation into a thermoplastic and the dispersibility of the formulation in the thermoplastic. This problem was addressed as described below.

Example 2

Preparation of Alternative Liquid Dispersion

This was as described in Example 1 except that Genitron EPE was replaced with a blowing agent formulation which did not include zinc oxide.

Examples 3 to 6

Treatment and Evaluation of Dispersions 500 g samples of the dispersions of Examples 1 and 2 were divided into equal parts. One part was stored as manufactured and the other part was treated to eliminate moisture by running on a Rotavapor (Trade Mark) at 60° C. for two hours. The products were stored at ambient temperature in sealed jars. Periodically the jars were opened and the viscosity measured using a Brookfield Viscometer. A summary of the examples is provided in the table below,

| Example No. | Detail |
|---|---|
| 3 | Example 1 formulation, stored as manufactured. |
| 4 | Example 1 formulation, moisture eliminated. |
| 5 | Example 2 formulation, stored as manufactured. |
| 6 | Example 2 formulation, moisture eliminated. |

Results are provided in FIG. 1, from which it can be seen that moisture has a major impact on the formulations, causing a rise in viscosity which in the case of Examples 3 and 5 could be detrimental to the use of the formulations.

Thus, it follows from the results described that it is desirable to provide liquid dispersions which include low levels of water, thereby to minimise the potentially detrimental rise in viscosity. In addition, it may be desirable to provide formulations which do not include zinc oxide since this appears to contribute to a viscosity rise. This may be due to zinc oxide being a cross-linker and, accordingly, it may be desirable to omit or minimise the level of zinc oxide and other potential cross-linkers from the formulations.

Formulations may be produced with low levels of moisture by selection of substantially dry ingredients (and/or drying ingredients prior to use) and controlling manufacture to minimise moisture ingress. After manufacture, formulations may be packaged in moisture resistant containers and during dosing into a thermoplastic, steps may be taken to reduce uptake of moisture by the formulations.

Alternatively (or in addition to) the method described above, formulations may include desiccants, as described in Examples 7 to 9 below, to reduce the level of available water therein and subsequently reduce the level of water in the polymer into which the formulations are dosed during melt-processing.

Examples 7 to 9 and Comparative Examples 1 and 2

Formulations were prepared and described in Example 1 except that calcium oxide and in some cases stabiliser or additional water) were included as detailed in the table below.

| | % in formulation | | | | |
|---|---|---|---|---|---|
| Material | Example 7 | Example 8 | Example 9 | Comparative Example 1 | Comparative Example 2 |
| Mineral Oil | 26 | 25 | 25 | 25 | 26 |
| Surfactant | 3 | 3 | 3 | 5 | 3 |
| Genitron EPE | 35 | 35 | 35 | 35 | 35 |
| Sodium Bicarbonate | 35 | 35 | 35 | 35 | 35 |
| Stabilizer | 0 | 0 | 0 | 0 | 1 |
| Calcium Oxide | 1 | 2 | 1 | 0 | 0 |
| Additional water | 0 | 0 | 0.15 | 0 | 0 |

Assessment of Formulations i) The effective moisture content of the formulation was assessed using a Brabender Aquatract+ moisture meter using 1 g of formulation in sample holder 3 at 80° C. until a steady state was achieved. Results were as follows:

| | Example 7 | Example 8 | Example 9 | Comparative Example 1 | Comparative Example 2 |
|---|---|---|---|---|---|
| Moisture Content % | 0.035 | 0.029 | 0.026 | 0.13 | 0.14 |

(ii) A sample of each formulation was left in an incubator at 50° C. to accelerate ageing. The viscosity was measured at room temperature (20-25° C.) using a Brookfield DV-I viscometer with spindle 4 at 20 rpm. The measurement was taken when the viscosity had reached a constant value (all values recorded in cPs).

Results were as follows:

| | Example 7 | Example 8 | Example 9 | Comparative Example 1 | Comparative Example 2 |
|---|---|---|---|---|---|
| As made | 3700 | 5300 | 3500 | 4700 | 1580 |
| 1 week at 50° C. | 4900 | 5700 | 4400 | Off scale | Off scale |
| 2 weeks at 50° C. | 5100 | 7000 | 4900 | Off scale | Off scale |
| 3 weeks at 50° C. | 4720 | 7200 | 4670 | Off scale | Off scale |
| 4 weeks at 50° C. | 4960 | 7180 | 4400 | Off scale | Off scale |
| 6 weeks at 50° C. | 5410 | 7410 | 4480 | Off scale | Off scale |

The formulations of Examples 7 to 9 can be used to produce foamed products which have better clarity (reduced haze) and tensile properties compared to products made using the formulations of comparative examples 1 and 2.

The formulations described herein may be used for foaming thermoplastic polymers. Advantageously, the formulations may be delivered directly into melt-processing apparatus, for example via the feed throat of an extruder, which may make changes to physical properties of products (e.g. sheet density) easier and more economical; and may make preparation of smaller quantities more economically viable.

The formulations may be of particular utility in foaming PVC, especially for PVC extruded foam sheet. Other PVC applications may include foam core pipes, construction cladding and window and furniture profiles.

The invention claimed is:

1. A liquid formulation for foaming a thermoplastic polymer, said formulation comprising:
   a carrier; and
   chemical blowing agents, wherein the total amount of chemical blowing agents in said formulation is at least 60 wt %;
   wherein said formulation includes at least 25 wt % of one or more endothermic chemical blowing agents;
   wherein said formulation includes at least 25 wt % of one or more exothermic chemical blowing agents; and
   wherein said formulation includes less than 0.3 wt % of water.

2. A formulation according to claim 1, wherein said formulation includes less than 0.13 wt % water.

3. A formulation according to claim 1, wherein the total amount of chemical blowing agents is at least 65 wt %.

4. A formulation according to claim 1 which includes 60 wt % or less of said one or more exothermic chemical blowing agents.

5. A formulation according to claim 4, wherein said one or more exothermic chemical blowing agents are selected from azodicarbonamide (ADC) and oxybissulphonylhydrazide (OBSH).

6. A formulation according to claim 5, which includes at least 20 wt % ADC, dispersed in said carrier.

7. A formulation according to claim 5 which includes at least 20 wt % OBSH dispersed in said carrier.

8. A formulation according to claim 1, which includes an activator which comprises a transition metal oxide.

9. A formulation according to claim 1, which includes at least 30 wt % and 60 wt % or less of said one or more endothermic chemical blowing agents.

10. A formulation according to claim 1, wherein said one or more endothermic blowing agents comprises a bicarbonate.

11. A formulation according to claim 10, which includes at least 10 wt % of a bicarbonate.

12. A formulation according to claim 9, wherein the ratio of the sum of the wt % of exothermic blowing agents to the sum of the wt % of endothermic blowing agents in said formulation is in the range 0.5 to 2.

13. A formulation according to claim 1, wherein the formulation comprises from 50-85 wt % solids.

14. A formulation according to claim 1, wherein said carrier comprises one or a plurality of oils.

15. A formulation according to claim 1, which includes less than 35 wt % of carrier.

16. A formulation according to claim 1, which includes
15 to 40 wt % carrier;
one or a plurality of exothermic chemical blowing agents, wherein the total amount of such blowing agents is in the range 25 to 45 wt %;
one or a plurality of endothermic chemical blowing agents, wherein the total amount of such blowing agents is in the range 25 to 45 wt %;
less than 0.13 wt % of water.

17. A formulation according to claim 1, which includes:
20 to 30 wt % mineral oil;
azodicarbonamide and oxybissulphonylhydrazide, wherein the total amount of such blowing agents is in the range 30 to 40 wt %;
a bicarbonate, wherein the total amount of bicarbonate in the formulation is in the range 30 to 40 wt %;
less than 0.13 wt % of water.

18. A formulation according to claim 1, which includes a desiccant dissolved or dispersed in said carrier of said liquid formulation.

19. A formulation according to claim 1, which includes at least 1 wt % of a surface active agent.

20. A formulation according to claim 19, wherein said surface active agent is a polymeric dispersant with amine anchor.

21. A method of preparing a liquid formulation according to claim 1, the method comprising:
contacting said carrier, said one or more exothermic chemical blowing agents, and said one or more endothermic chemical blowing agents; and
either (1) treating the formulation after preparation to reduce the level of water contained within the formulation; or (2) contacting the carrier with a desiccant.

22. A method of preparing a foamed thermoplastic polymer, the method comprising contacting said liquid formulation according to claim 1 with a thermoplastic polymer or a precursor of a thermoplastic polymer.

23. A method according to claim 22, wherein said thermoplastic polymer comprises PVC.

24. A method according to claim 22, said method being for making an extruded foam material, the method comprising contacting said thermoplastic polymer and said liquid formulation according to claim 1 in an extruder under such conditions that the liquid formulation produces gas which foams the polymer.

25. A method according to claim 24, wherein the extruded foam material is made from PVC.

26. A liquid formulation as claimed in claim 1, wherein said liquid formulation as made has a viscosity at 20-25° C. of no more than 5300 cP when measured using a Brookfield DV-I viscometer with spindle 4 at 20 rpm.

27. A liquid formulation as claimed in claim 1, wherein the rise in viscosity of said liquid formulation measured at 20-25° C. after incubation of said formulation at 50° C. for 6 weeks is no more than 2100 cP when measured using a Brookfield DV-I viscometer with spindle 4 at 20 rpm.

* * * * *